(12) United States Patent
Faulkner (10) Patent No.: US 6,884,077 B2
(45) Date of Patent: Apr. 26, 2005

(54) APPARATUS FOR MATH CALCULATION AND INSTRUCTION

(76) Inventor: Lydia Marie Faulkner, P.O. Box 222292, Chantilly, VA (US) 20153

( * ) Notice: Subject to any disclaimer, the term of this patent is extended or adjusted under 35 U.S.C. 154(b) by 427 days.

(21) Appl. No.: 09/858,573

(22) Filed: May 17, 2001

(65) Prior Publication Data

US 2002/0172927 A1 Nov. 21, 2002

(51) Int. Cl.⁷ .............................................. G09B 19/02
(52) U.S. Cl. ........................ 434/188; 434/202; 434/205
(58) Field of Search ................................ 434/188, 198, 434/202, 205, 194, 112, 116, 117; 234/85 R, 87 R, 79; 235/85 R, 87 R, 79

(56) References Cited

U.S. PATENT DOCUMENTS

| | | | | | |
|---|---|---|---|---|---|
| 613,432 | A | * | 11/1898 | Szenhak | 235/3 |
| 1,720,499 | A | * | 7/1929 | Walker | 235/64 |
| 2,395,609 | A | * | 2/1946 | Andrews | 235/117 A |
| 2,533,569 | A | * | 12/1950 | Espinola | 235/87 R |
| 3,949,491 | A | * | 4/1976 | Harte | 434/194 |
| 4,714,429 | A | * | 12/1987 | Phillips | 434/198 |
| 5,007,840 | A | * | 4/1991 | Gaskell | 434/188 |

* cited by examiner

Primary Examiner—Kien Nguyen (57) ABSTRACT

An apparatus and method for teaching mathematics to children is disclosed. In one embodiment, the apparatus comprises a flat, ruler-like rod having expressed on one face a vertically arranged base-ten number line; lips at the ends of the rod; spaced-apart grooves on the back face of the rod; and an attached sleeve sized to snugly accommodate the rod and to slide thereon while indicating respective numerals on the number line. The sleeve is prevented from being separated from the rod by the lips on the rod. The sleeve has a transparent portion to frame individual numerals on the number line as the sleeve slides along the rod. On the inner portion of the reverse side of the sleeve a projection made of flexible material strikes the interior portion of individual grooves as the sleeve slides along the rod. In operation, the apparatus provides an audible and felt "click" as the sleeve passes over each numeral. A method is described for using the apparatus to teach elementary school children math concepts using a vertically oriented number line.

18 Claims, 11 Drawing Sheets

APPARATUS FOR MATH CALCULATION AND INSTRUCTION

CROSS-REFERENCE TO RELATED APPLICATIONS

Not applicable.

BACKGROUND—FIELD OF INVENTION

This invention relates to tools and methods for teaching math concepts to young children and specifically to devices carrying number lines.

BACKGROUND

There is an unmet need for a simple device and method for teaching math to young children by utilizing their near-instinctive understanding that higher means "more" and lower means "less." Currently, educators teach math to young children through the use of equations, inequalities, and number lines that are expressed horizontally and that are meant to be read left-to-right as one would read a sentence. At the same time, they use terms like "higher," "bigger than," "more" and "larger" even though none of the instructional tools appears to be any of those things. This method of teaching math is counter-intuitive to a very young child—who has barely learned to read (if at all), may or may not know left from right, and in any event has no experiences in the real world that would lead to the conclusion that relative placement of a numeral to the right means "higher" or that placement to the left means "lower."

There is an unmet need for simple math instruction devices that provide visual, aural and tactile stimuli as the child uses the device to solve, and comprehend the meaning of, simple math problems. Generally, children learn best when information is presented through a combination of sight, hearing and touch. Many children have a particular affinity for a particular mode of learning, and they may be categorized as "visual learners, "aural learners" or "tactile learners". Other children may have particular deficits (more or less serious) in visual, auditory or tactile processing. Still other children have physical disabilities, such as blindness, that may wholly or partially foreclose a mode of learning. If children are able to hold and manipulate a math instruction tool that provides visual, aural and tactile stimulation, mathematical information has a far better chance of being understood and retained. With the notable exception of the abacus, no simple math calculation tool combines sight, hearing and touch in one device.

There is an unmet need for a means to teach young children negative numbers. It is generally thought that kindergarten through third-grade children are not typically ready to grasp this concept. As a result, while a child is encouraged to subtract 3 from 5, or to add from zero to infinity, the child is discouraged—or even forbidden—from subtracting 5 from 3. By the time the negative number concept is taught in later grades, the child's sense of numbers is often so ingrained that the very notion of something less than zero seems alien. A device that provides an easy way for a young child to do simple problems that result in negative-number answers would allow for earlier introduction of an important math concept and may prevent the cognitive dissonance often generated when introduction occurs later in a child's development.

SUMMARY

My invention is an apparatus and method for teaching mathematics to children. In all of the embodiments discussed herein, a hand-held structure bears a base ten number line with vertically oriented numerals.

By "number line," I mean the commonly understood meaning of the term. The American Heritage Dictionary (2000) defines a "number line" as "line that graphically expresses the real numbers as a series of points distributed about a point arbitrarily designated as zero and in which the magnitude of each number is represented by the distance of the corresponding point from zero". For purposes of this application, I adopt this definition with the understanding that (a) the line may be drawn or formed by a physical element of a structure, such as a linear edge of a rod or a linear slit in a panel; (b) the "points" may be expressed on or in proximity to the line; and (c) the "points" may be expressed as marks, structural elements or as the numbers themselves. In other words, a "number line," reduced to its essential elements, is a substantially visible, two-dimensional and linear line along which an evenly spaced and sequentially ordered series of real numbers extend from the number zero (e.g. 0, 1, 2, 3 . . . or −15, −10, −5, 0, 5, 10, 15 . . .) in such a way that the user can visually perceive the physical distance of a number from other numbers, and particularly from the number zero.

By "vertically," I mean that the numerals are oriented so that they can be read most easily when the relevant line of the number line is perpendicular to the ground or to the user. In contrast, the numerals of standard rulers, slide rules and number lines are expressed horizontally.

A slidable member capable of visually indicating respective numerals on the number line engages with the structure and slides thereon. In the preferred embodiment, the slidable portion includes a flexible projection that strikes the interior of grooves on the structure so that sound and vibrations are created as the slidable portion slides along the structure. The grooves are positioned so that a sound and vibration is made as each numeral on the number line is indicated by the slidable portion. Various simple math concepts, including number recognition, addition, subtraction, place value, inequality, negative numbers and simple algebra can be practiced with the invention.

Alternative embodiments include a ruler incorporating the invention, a structure with interchangeable panels carrying different number lines, and a manual calculator incorporating a plurality of number lines and slidable members. The invention and all of the embodiments may bear a drawn line and drawn points, but the need for such additional visual aids is not essential where a number line device includes a slidable member to physically travel the distance between numbers and/or a sound-making means can aurally emphasize the number of points on the line that a slidable member has traveled.

Also claimed is a method for teaching simple math concepts to children, which method comprises the steps of providing a vertically arranged number line, providing an indicator to show individual numerals on the number line, and positioning the indicator to show mathematical concepts by reference to the more intuitively appealing high-low relationships between numerals.

OBJECTS

It is an object of the invention to provide a vertically oriented number line for teaching children math concepts. It is a further object to provide a simple device for teaching children math concepts through the manipulation of an indicator over a vertically oriented number line. It is a further object of the invention to provide a simple device for teaching math concepts to children that produces a visual, aural and tactile stimulus as math problems are solved using the device. It is a further object of the invention to provide a simple device that allows children to practice math problems for longer periods because the tool provides positive aural and tactile stimulation that is fun for the child. It is a further object of the invention to provide a simple device for teaching negative number concepts to young children. It is a further object of the invention to provide a simple manual calculator for use by children. It is a further object of the invention to provide a device that reenforces a child's comprehension of number relationships. It is a further object of the invention to provide a method of math instruction that teaches young children math concepts through the use of vertically arranged numerals on a number line. Further objects and advantages of the invention will become apparent from a consideration of the drawings and ensuing description.

DRAWING FIGURES

In the drawings, closely related figures have the same number but different alphabetical suffixes.

DESCRIPTION

A preferred embodiment of the math instruction tool of the present invention is illustrated in FIGS. 1A through 1D. The math instruction tool has a flat rod 10 approximately the size and shape of a ruler (12"×1"×0.2"), it being understood that many different sizes can be used. It is contemplated that rod 10 can be made of any durable material including wood, plastic or metal. A sleeve 26 encircles rod 10 and is sized to snugly fit and slide along rod 10. At each end of rod 10 is an attached lip 14 sized to prevent sleeve 26 from becoming disengaged from rod 10.

Figure 1A:
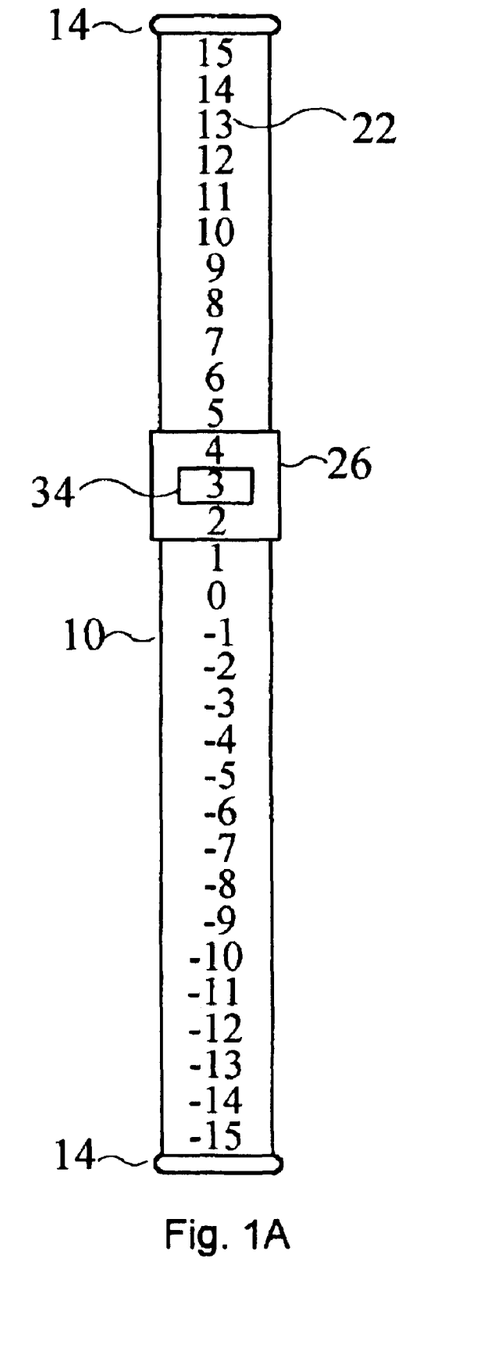
FIG. 1A shows a front view of the preferred embodiment.
Figure 1B:
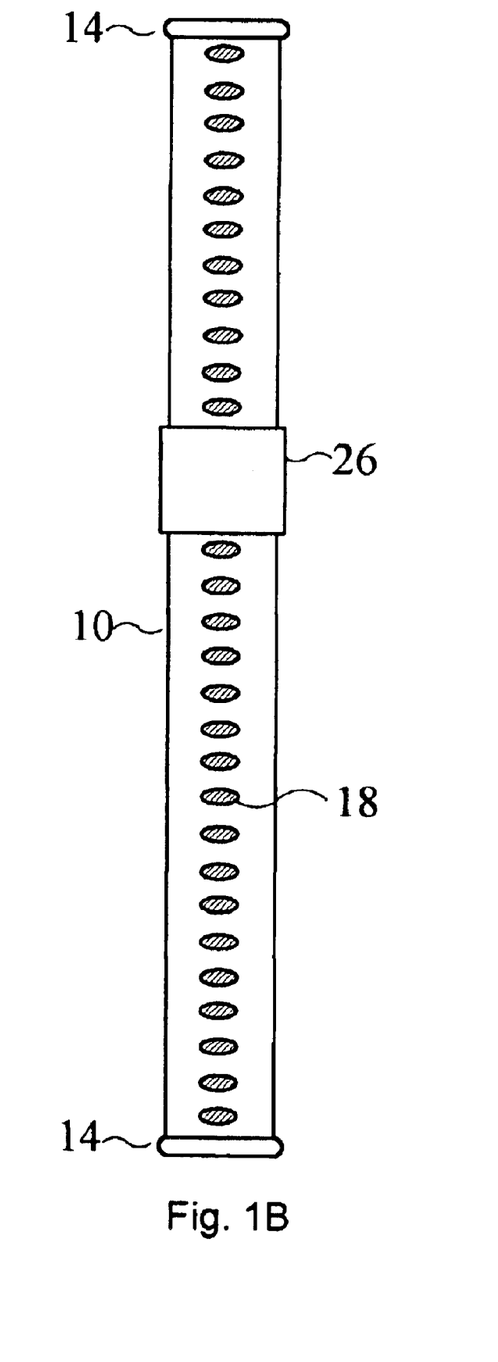
FIG. 1B shows a rear view of the preferred embodiment.
Figure 1C:
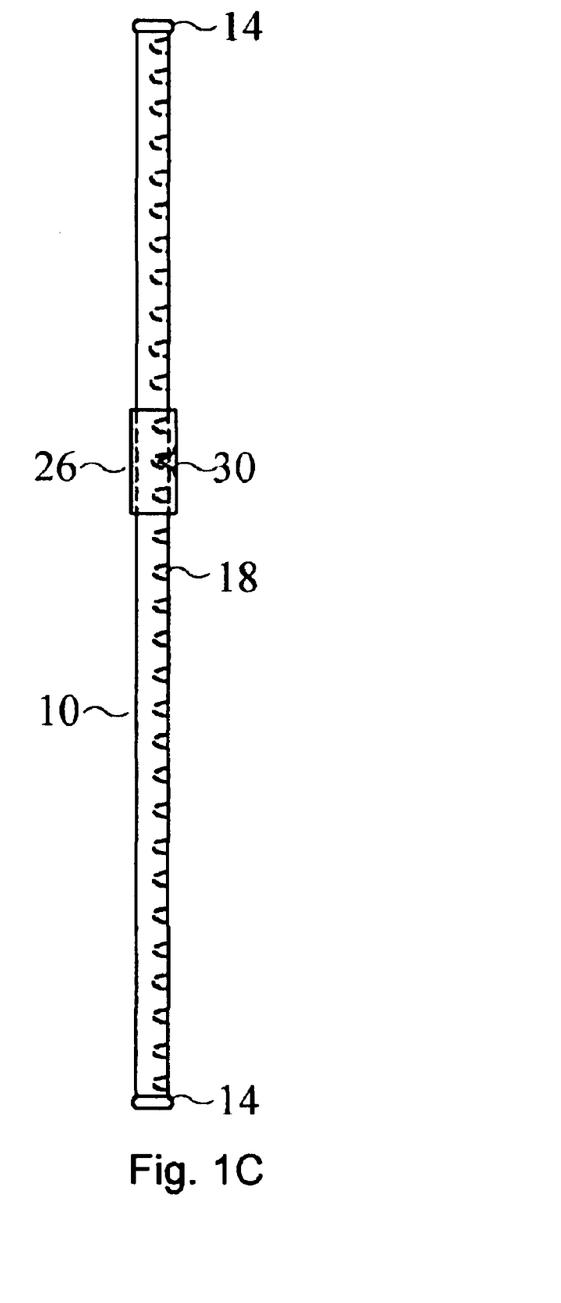
FIG. 1C shows a side view of the preferred embodiment.
Figure 1D:
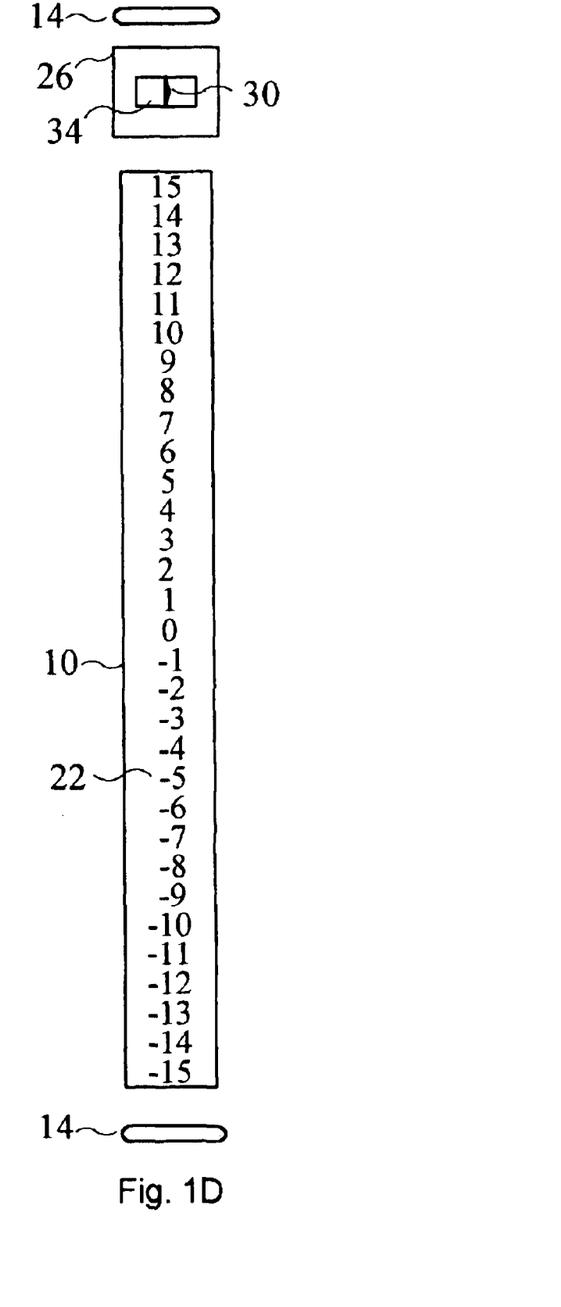
FIG. 1D shows an exploded view of the preferred embodiment.

On the front face of rod 10 is a series of numerals 22 arranged vertically in relationship, to the linear lines formed by the edges of rod 10, as shown in FIG. 1A. It is contemplated that the numerals in series 22 may be imprinted, printed in relief, and/or expressed in symbols such as braille. As shown in FIG. 1B, on the back face of rod 10 is a plurality of transverse elliptical grooves 18, spaced apart to correspond to the spacing of numerals in series 22, it being understood that holes, projections, riffles or teeth could be used instead of grooves 18. It is further understood that such grooves, etc., can be positioned on the front face of rod 10 or along either or both sides of rod 10.

On the face of sleeve 26 is a transparent portion 34 sized to accommodate one numeral in series 22. Transparent portion 34 may comprise empty space or can be made of transparent material such as plastic or glass. On the interior wall of the back portion of sleeve 26 is a projection 30 made of flexible material such as thin metal or plastic and sized and positioned to strike the interior of grooves 18 with sound-making force as sleeve 26 slides along rod 10. It is understood that various slidable elements (e.g., an element sliding on a groove or track, a magnetized element sliding along a flat metal surface, etc.) could be used instead of a sleeve.

In operation, the user slides sleeve 26 along rod 10 to solve simple math problems, experiencing an audible and felt "click" as sleeve 26 passes over a numeral in series 22 while, simultaneously, transparent portion 34 "lands on" a number and projection 30 strikes the interior wall of the corresponding groove 18. It is understood that other sound-making means, including electronic, could be used to generate sound as sleeve 26 passes over a numeral in series 22. The user thus can perceive the differences in magnitude between individual numbers by seeing their distance from zero, moving sleeve 26 along the number line formed by series 22 and the edge(s) of rod 10, and counting the number of heard and felt "clicks."

As contemplated, rod 10 is to be held vertically, or, alternatively, laid face up on a surface with the end corresponding to the lowest numeral pointing at the user.

When used to facilitate number recognition, the child simply views series 22 and learns the numerical symbols and the order in which they are normally arranged.

When solving simple addition and subtraction problems, sleeve 26 is first positioned so that transparent portion 34 covers the first numeral in series 22 specified in the equation, then made to slide (up for addition, down for subtraction) such that sleeve 26 "clicks" as many times as called for by the second specified number in the equation. For example, to solve 4+3, the user positions sleeve 26 so that transparent portion 34 frames the numeral 4, then slides sleeve 26 up until he or she has seen transparent portion 34 land on three successive numerals, heard three audible "clicks", and felt three sets of vibrations as projection 30 passes over three grooves 18. The user would then see the numeral 7 framed in transparent portion 34.

When used to solve equations resulting in negative numbers (e.g., 3–4), the user positions sleeve 26 so that transparent portion 34 frames the numeral 3, then slides sleeve 26 along rod 10 such that sleeve 26 "clicks" the specified number of times called for by the second number in the equation, yielding, in the example, the number –1.

When used to determine an inequality, sleeve 26 is first positioned so that transparent portion 34 frames the comparing numeral, and the child is instructed that, if sleeve 26 must slide up to reach the compared numeral, the comparing numeral is less than the compared numeral, and vice versa. The device will also show the child that the number 7 is more than the numbers 6, 5, etc., and that it is less than the numbers 8, 9, 10, etc.

When solving simple algebra involving addition (e.g., 4+x=7), the device is used in one of two ways. The user could cover the numeral 4 with transparent portion 34, then count the number of clicks needed to reach the numeral 7. Or the user, if instructed to subtract the number 4 from both sides of the equation, yielding x=7–4, could cover the numeral 7 with transparent portion 34 and then "click" down to the numeral 4. For solving simple algebra problems involving inequalities (e.g., 7+x$\leq$10), the user frames the numeral 7 with transparent portion 34 and slides sleeve 26 up to numeral 10, determining that any number less than four solves the problem for x. Thus, the device can be used in a number of ways to introduce children to algebraic problem solving.

For vision-impaired children, raised or braille numerals would be expressed on rod 10, it being understood that a device in accordance with the embodiment may be larger to enable the child to more easily identify the numeral located in transparent portion 34. By feeling the numerals, and by hearing and feeling the "clicks" as the sleeve 26 slides along rod 10, the child can perform and practice all of the calculations set forth above.

ALTERNATIVE EMBODIMENTS

Alternative Embodiment—Pointers

Figure 2:
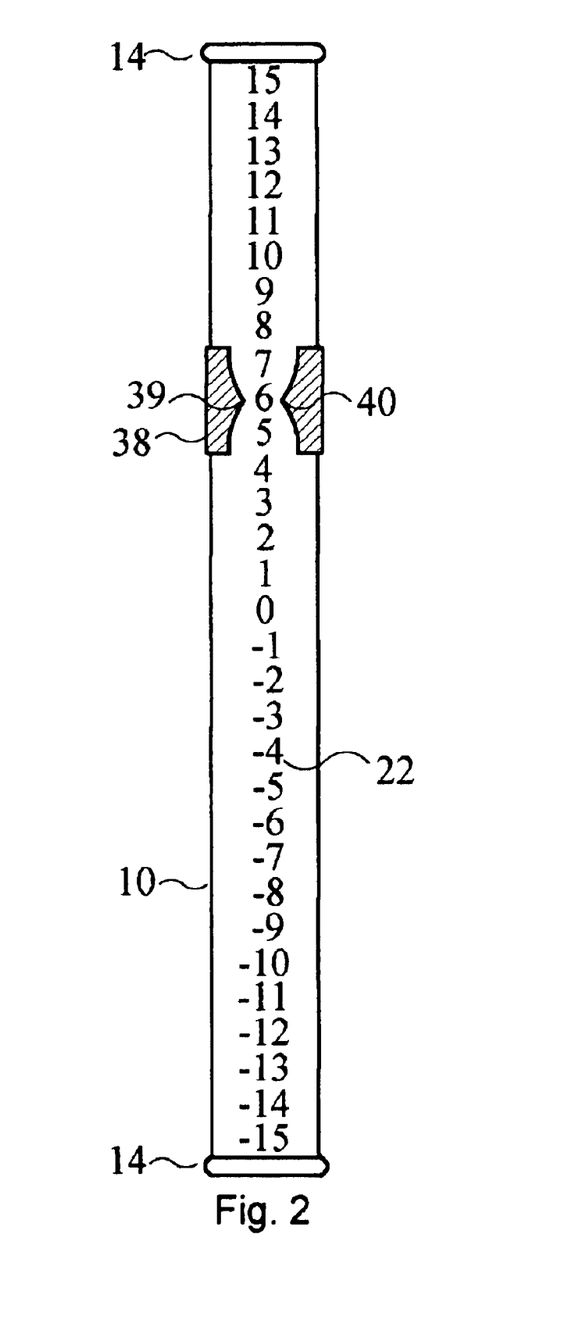
FIG. 2 shows a front view of a second embodiment

FIG. 2 shows a second embodiment having the same elements as the preferred embodiment except that sleeve 38 only partially encircles rod 10. Centered on the visible edges of the front portion of sleeve 38 are projections 39 and 40 in the form of pointers. In operation, this embodiment is used as discussed above except that sleeve 38 indicates a specified numeral with projections 39–40 rather than transparent portion 34. It is understood that various indicators could be used, such as arrow symbols expressed on the sliding element. Or the visible portion of the sliding element may be roughly the same size of a numeral, and placement of the visible portion next to a numeral would serve to visually specify it. Or a transparent portion could include a horizontally disposed line that partially covers a numeral, thus visually indicating it.

Alternative Embodiment—Other Shapes

Figure 3:
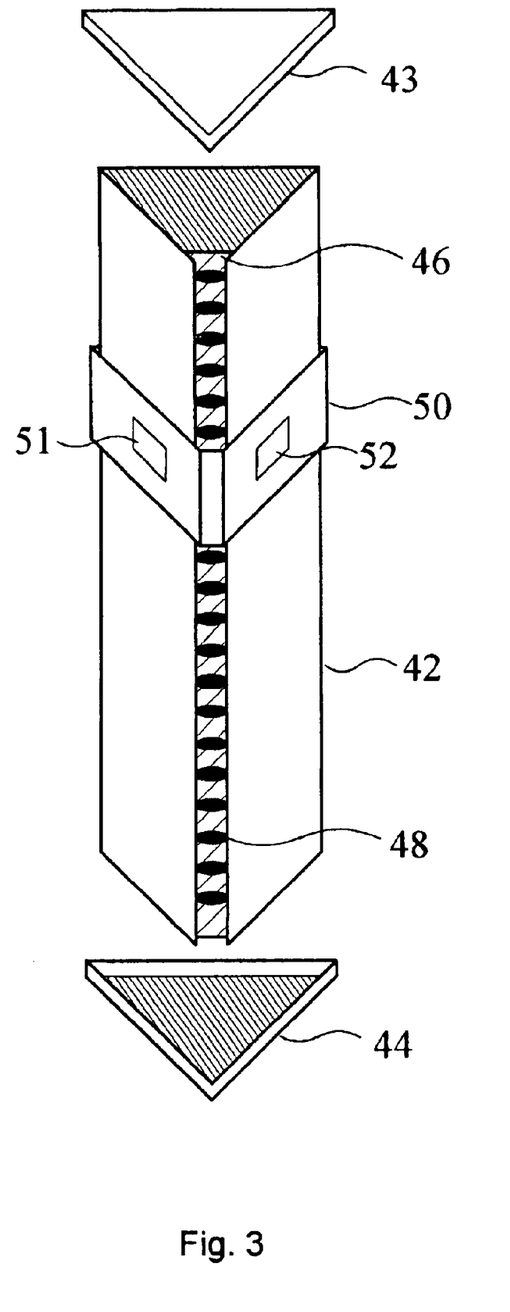
FIG. 3 shows a perspective, partially exploded view of a third embodiment.

FIG. 3 shows a third embodiment comprising a triangle-shaped rod 42 with an interior channel 46 running lengthwise along rod 42, as shown. Channel 46 includes spaced-apart openings 48. Rod 42 with triangle-shaped caps 43 and 44 accommodates a first number line (not shown) comprising a distinct set of numerals, a second number line (not shown) comprising a distinct set of numerals, and a third number line (not shown) comprising a distinct set of numerals. A triangle-shaped sleeve 50 with windows 51 and 52 and a third window (not shown) is sized to snugly fit and slide along rod 42. On one interior fold of sleeve 50 is a flexible projection (not shown) in accordance with the invention that strikes openings 48 as sleeve 50 slides along rod 42. Other polygonal-shaped rods, irregular polygonal-shaped rods or irregularly shaped rods can be similarly accommodated to the invention. It is understood that multiple channels 46 could be used. It is further understood that rod 42 could be made so that multiple sleeves, one for each face of the rod, may be used.

Alternative Embodiment—Improved Ruler

Figure 4A:
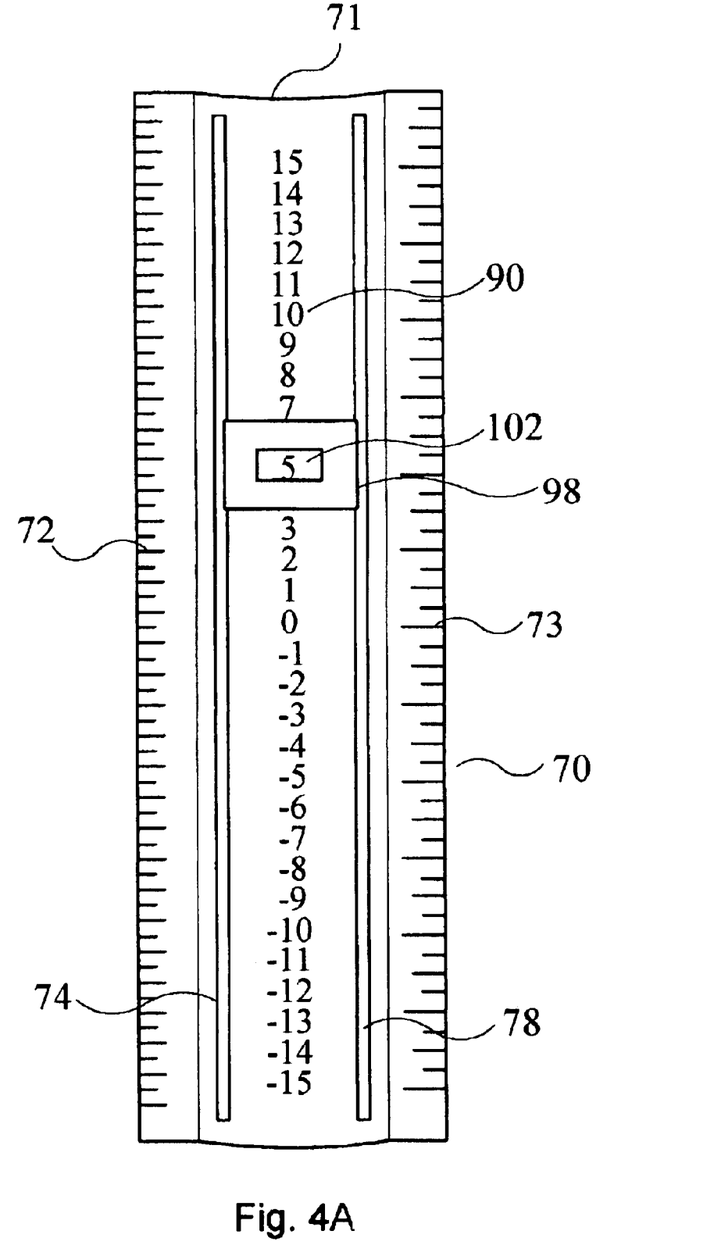
FIG. 4A shows a front view of a fourth embodiment.
Figure 4B:
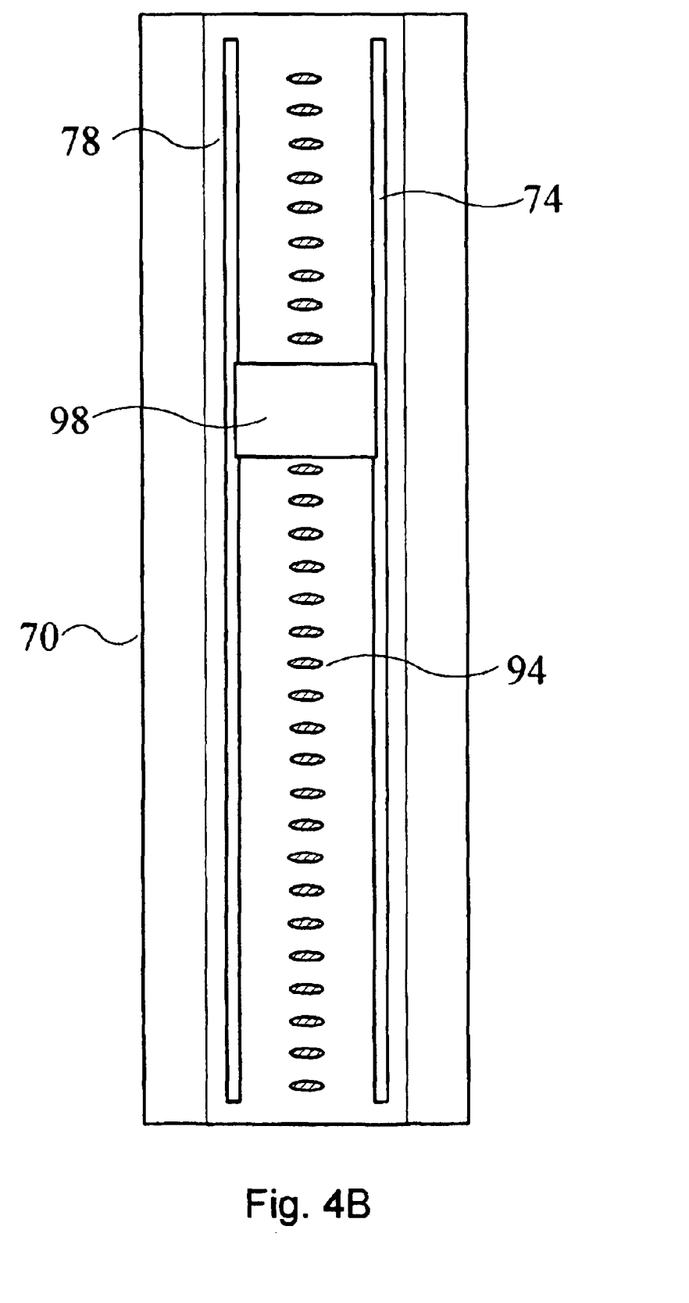
FIG. 4B shows a back view of a fourth embodiment.
Figure 4C:
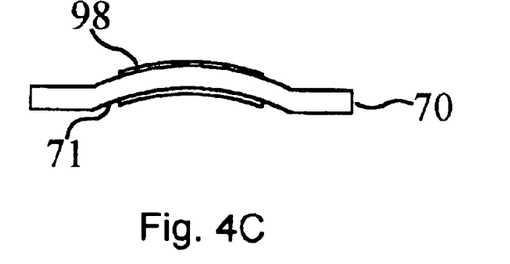
FIG. 4C shows an end view of a fourth embodiment.

FIGS. 4A through 4C show a fourth embodiment including a rod 70 having parallel slits 74 and 78. Rod 70 has an arch 71. Along front face edges 72 and 73 are expressed markings comprising a system of linear measurement so that rod 70 can function as a standard ruler. Expressed vertically along rod 70 and between slits 74 and 78 is a series of numerals 90. Sleeve 98 passes through slits 74 and 78. A transparent portion 102 of sleeve 98 is sized and positioned to frame respective numerals in series 90 as sleeve 98 slides along slits 74 and 78. On the interior rear wall of sleeve 98 is a projection (not shown) in accordance with the invention that strikes the interior portion of grooves 94 with sound-making force as sleeve 98 slides along slits 74 and 78.

Arch 71 is common in standard rulers, and this structure provides the added value of accommodating a sleeve in accordance with the invention without interfering with ruler functions. It is understood that any longitudinal groove, channel or linear indention could be used rather than an arch.

Alternative Embodiment—Interchangeable Panels

Figure 5:
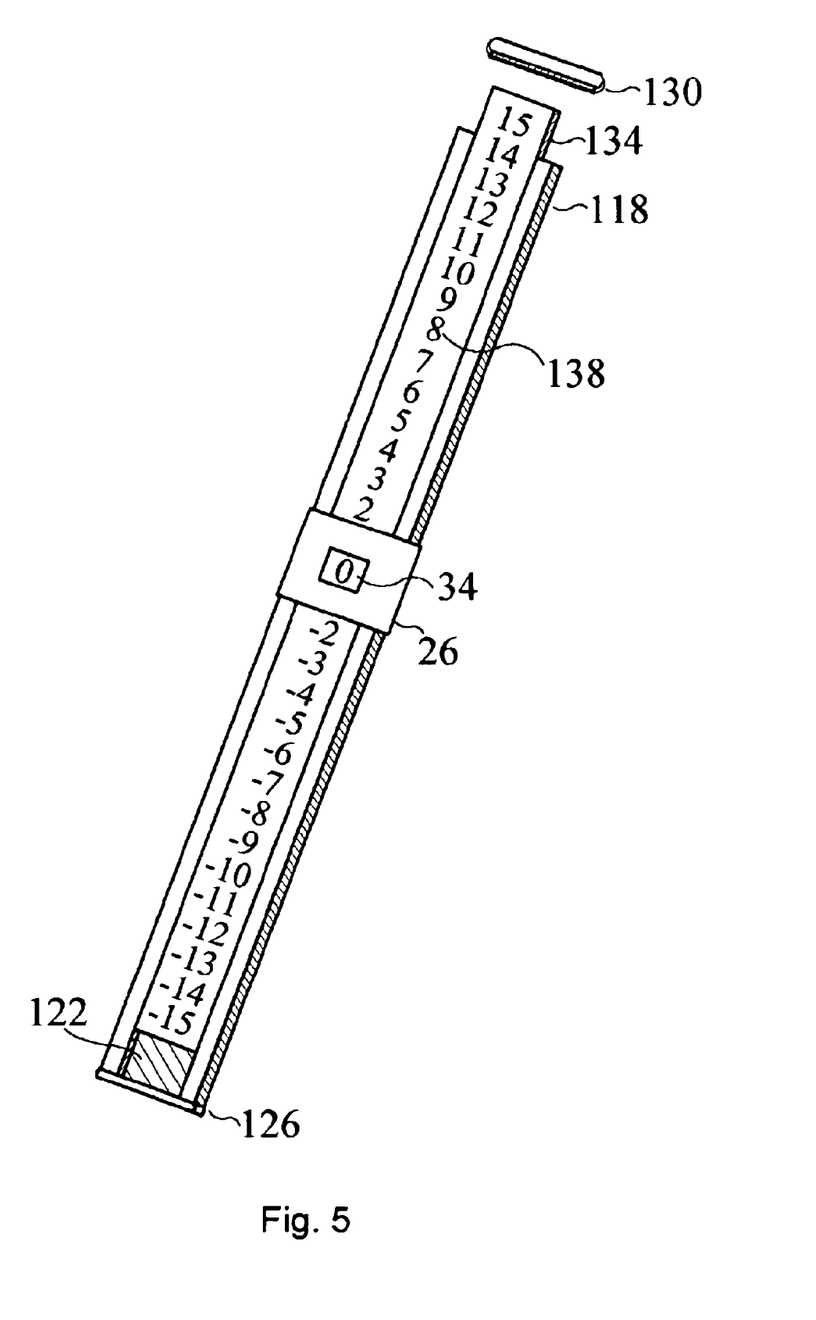
FIG. 5 shows a perspective view of a fifth embodiment.

A fifth embodiment, shown in FIG. 5, is a 1"×12"×⅛" rod 118 with a ½"×12"×1/16"-deep channel 122 running lengthwise along the front face, it being understood that various sizes of rods and channels may be used. At the bottom end of rod 118 is fixed cap 126, and, at the top end, detachable cap 130. Sleeve 26, with window 34, encircles rod 118. A ½"×12"×1/16" panel 134 is detachably inserted into channel 122. Panel 134 has expressed thereon a vertically arranged series of numerals 138 in accordance with the invention. Panel 134 may be made of cardboard, paper or more durable material such as wood, metal or plastic. Optionally, rod 118 may include a transparent portion (not shown) covering channel 122, which protects panel 134 and helps hold it in place. Additional panels (not shown) have expressed thereon a variety of number lines or other teaching aids.

The user operates the device as discussed above. To change panels, the user removes detachable cap 130, removes panel 134 by sliding it out of channel 122, slides a replacement panel (not shown) into channel 122, and re-attaches cap 130.

Alternative Embodiments—Manual Calculator

Figure 6:
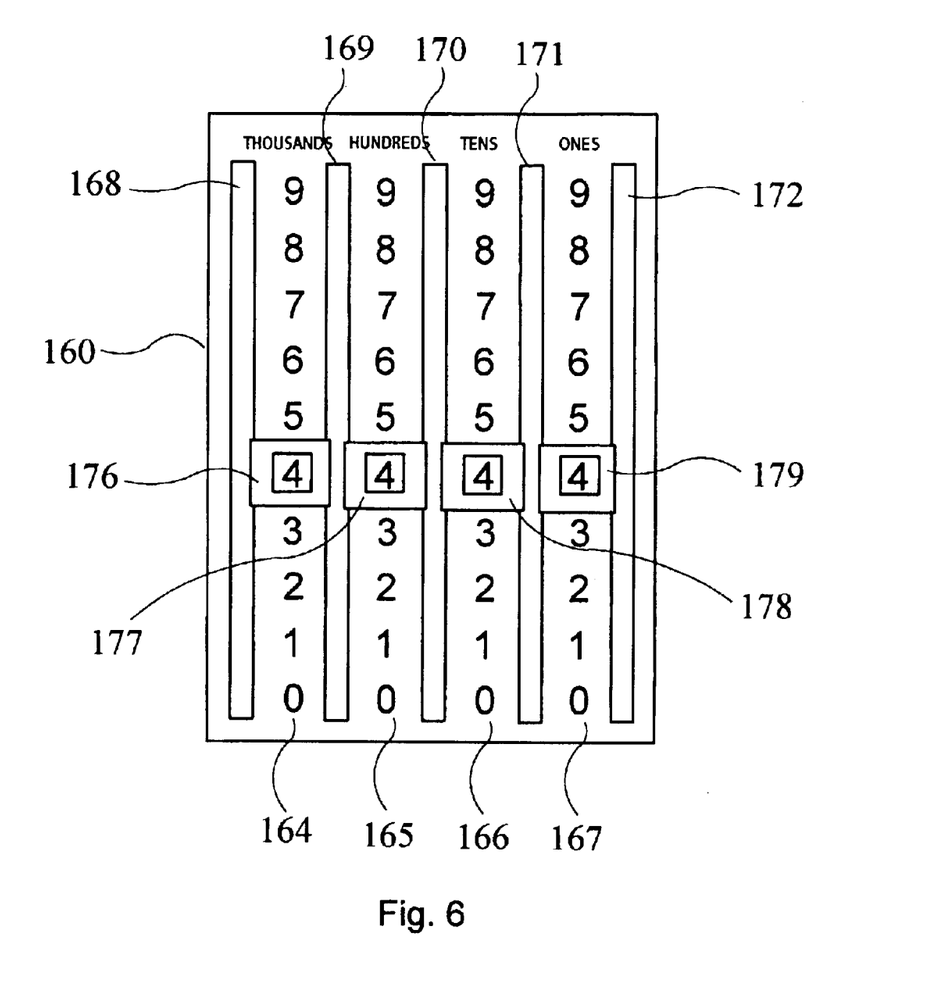
FIG. 6 shows a front view of a sixth embodiment.

A sixth embodiment, shown in FIG. 6, is a manual calculator. In this embodiment, flat panel 160 has four vertically oriented series of numerals 164–167 having expressed thereon the numerals 0 through 9. Running on each side of each series 164–167 are slits 168–172. Sleeve 176 passes through slits 168 and 169, and a projection on the back interior portion of sleeve 176 (not shown) engages with grooves (not shown) on the back face of panel 160 in accordance with the preferred embodiment. In like manner, sleeve 177 passes through slits 169 and 170, sleeve 178 passes through slits 170 and 171, and sleeve 179 passes through slits 171 and 172. Above series 164–167 appear expressions of mathematical place value (e.g., "THOUSANDS," "HUNDREDS," "TENS, " "ONES").

In operation, the user solves various math problems by moving sleeves 176–179 along series 164–167. Thus, for example, to solve the equation 42+17=x, the user positions sleeve 179 to frame the numeral 2 and positions sleeve 178 to frame the numeral 4. Moving sleeve 179 seven "clicks" upward and sleeve 178 one "click" upward yields the answer 59. To solve the equation 777+555=x, the user positions sleeves 177–79 to frame the numeral 7 on series of numerals 165–67 and positions sleeve 176 to frame the numeral zero on series 164. The user then moves sleeve 179 up two clicks, drop to zero, up two clicks (for a total of five movements) to the numeral 2 on series 167. "Carrying the one," the user then moves sleeve 178 up two clicks, drop to zero, up three clicks (for a total of six movements) to the numeral 3 on series 166. Carrying the one, the user then moves sleeve 177 up two clicks, drop to zero, then up three clicks to the numeral 3 on series 165. Carrying the one, the user then moves sleeve 176 up one click to the numeral 1 on series 164. Reading left to right, the user then sees that the numerals 1, 3, 3, and 2 are indicated. This corresponds to the answer to the equation (i.e., 777+555=1,332). It is understood that panel 160 may form the face of another structure, such as a case or notebook.

An eighth embodiment (not shown) is identical to the seventh embodiment except that panel 160 has been folded to form a four-sided rod, capped at the ends, with a number line-sleeve assembly on each face of the rod, and the place value designations changed to "1s", "10s", "100s" and "1000s."

ADVANTAGES

As described and illustrated, the invention provides a tool and method for teaching young children math concepts through the use of a more understandable number line device that, in the embodiments discussed, simultaneously engage multiple senses. This is a marked improvement over all prior number line devices because young children understand math in vertical terms, and because learning and memory are enhanced dramatically when information is taken in through more than one sense. It is believed that all children, including children with a special abilities, processing deficits or physical handicaps, may greatly benefit from the various embodiments. Further, the invention allows more complicated math concepts, such as negative numbers, to be presented in a manner that is better adapted to the cognitive ability of young children. Still further, the invention provides a math instruction tool for visually impaired children that emphasizes learning through aural and tactile stimuli. Another advantage is that it is likely to be perceived as far more fin than a typical number line, making it more likely that the child will learn more, remember more, and practice more. Other advantages are revealed in the description and drawings.

SCOPE

Although the description above contains many specifications, these should not be construed as limiting the scope of the invention but as merely providing illustrations of some of the presently preferred embodiments of the invention. For example, the structure could be substantially larger for use by an instructor. Various means can be contemplated for allowing the invention to be kept in a child's notebook (e.g., projections with openings to accommodate a ring binder). Thus, the scope of the invention should be determined by the appended claims and their legal equivalents, rather than by the examples given.

I claim:

1. A math instruction tool comprising a hand-held structure bearing a vertically oriented base ten number line, a slidable member to engage said structure and to slide along maid number line, and means on said slidable member to indicate individual numerals on said number line as said slidable member slides along said number line, and sound-making means to aurally indicate the movement of said slidable member as it slides along said structure.

2. The math instruction tool of claim 1 wherein said structure is a rod.

3. The math instruction tool of claim 1 wherein said structure comprises a plurality of faces to accommodate respective number lines.

4. The math instruction tool of claim 1, wherein said slidable member Is a sleeve sized to slidably engage said structure.

5. The math instruction tool of claim 1 wherein said slidable member partially encircles said structure.

6. The math instruction tool of claim 1, wherein said slidable member includes a projection to slidably engage an opening extending along a portion of said structure.

7. The math instruction tool of claim 1, wherein said slidable member includes an opening to engage at least one track lengthwise along a portion of said structure.

8. The math instruction tool of claim 1, wherein said indicating means is an opening on said slidable member sized to frame respective numerals said number line.

9. The math instruction tool of claim 1, wherein said indicating means is a projection on said slidable member.

10. The math instruction tool of claim 1, wherein said indicating means comprises markings on said slidable member.

11. The math instruction tool of claim 1, further including a system of linear measurement expressed along an edge of said structure.

12. The math instruction tool of claim 1, wherein said number line is expressed on a detachable panel.

13. The math instruction tool of claim 1, wherein said sound-making means comprises a plurality of openings on said structure and a projection on said slidable member is positioned to strike the interior portion of respective openings as said slidable member slides along said structure.

14. The math instruction tool of claim 1, wherein said sound-making means comprises a plurality of projections extending from said structure and a flexible portion on said slidable member is positioned to engage and release respective projections as said slidable member slides along said structure.

15. The math instruction tool of claim 1, wherein said sound-making means comprises a fixed projection on said slidable member and flexible projections arrayed along said structure to engage and release said fixed projection as said slidable member moves along said structure.

16. The math instruction tool of claim 1, wherein said sound-making means comprises an opening on said slidable member and flexible projections arrayed along said structure to engage and release said opening as said slidable member moves along said structure.

17. The math instruction tool of claim 1, wherein said tool includes a power source and said sound-making means is electronic.

18. A math instruction tool comprising handheld structure bearing a line, which may be formed by a physical element of said structure, said line being substantially two-dimensional and linear, an evenly spaced and sequentially ordered series of real numbers, including the number zero, distributed in a vertical orientation along said line, a slidable member to engage said structure and to slide along said line and said series, and means on said slidable member to indicate individual numbers as said slidable number slides along said line and said series, and sound-making means to aurally indicate the movement of said slidable member as it slides along said structure.

* * * * *